United States Patent [19]
Yumde et al.

[11] 3,905,039
[45] Sept. 9, 1975

[54] SYSTEM FOR BAND CONVERSION OF COLOR PICTURE SIGNAL

[75] Inventors: Yasufumi Yumde; Takashi Furuhata, both of Yokohama, Japan

[73] Assignee: Hitachi, Ltd., Japan

[22] Filed: Sept. 12, 1973

[21] Appl. No.: 396,611

[30] Foreign Application Priority Data

Sept. 20, 1972 Japan .............................. 47/93606
Sept. 20, 1972 Japan .............................. 47/93607

[52] U.S. Cl. .............................................. 358/11
[51] Int. Cl.$^{2}$ ........................................ H04N 9/42
[58] Field of Search .......... 178/5.2 R, 5.4 C; 358/11

[56] References Cited

UNITED STATES PATENTS 3,553,356 1/1971 Groll .............................. 178/5.4 C
3,598,904 8/1971 Foerster .......................... 178/5.4 C

*Primary Examiner*—Richard Murray
*Attorney, Agent, or Firm*—Craig & Antonelli

[57] ABSTRACT

A system for converting a simultaneous color picture signal of a wide band into a field sequential color picture signal of a narrow band and a system for reconverting a field sequential color picture signal of a narrow band into a simultaneous color picture signal of a wide band. The former system comprises memory means capable of varying the writing speed and the reading speed and having the memory capacity capable of storing a picture signal of one frame, means for switching two input signals to output them at every field period, means for obtaining one of the two chrominance signals of a simultaneous color picture signal at the odd numbered field and obtaining the other chrominance signal at the even numbered field by means of the switching means, and means for writing at a high speed and reading at a low speed in and from the memory means the luminance signal and the chrominance signals different at every field of the color picture signal. The latter system comprises memory means capable of varying the writing speed and the reading speed, having the memory capacity capable of storing a picture signal of one frame, capable of repeatedly reading the stored signal therefrom, and capable of simultaneously reading therefrom signals differing by one field period from each other, means for writing a signal of one frame of a field sequential color picture signal of a narrow band in the memory means at a low speed, and means for repeatedly reading the stored signal at a high speed and obtaining two chrominance signals from the simultaneously read out signals differing by one field period.

11 Claims, 6 Drawing Figures

SYSTEM FOR BAND CONVERSION OF COLOR PICTURE SIGNAL

BACKGROUND OF THE INVENTION

1. Field of the Invention

The present invention relates to a system for frequency band conversion of a color picture signal, and more particularly, to a system for frequency band conversion of a color picture signal suitable for transmitting or recording and reproducing a stationary color picture signal or a frame skip type picture signal of a color television signal by the use of a transmission medium having a narrow frequency band characteristic such as, for example, a telephone circuit or a voice magnetic tape.

2. Description of the Prior Art

A conventional transmission system in which a frame skip type stationary color picture signal is subjected to band conversion has the disadvantage that, when a simultaneous color picture signal resulting from frequency multiplication of a luminance signal and a carrier chrominance signal obtained by the quadrature amplitude modulation of a carrier with two kinds of color difference signals is subjected to band conversion to be transmitted through a transmission medium such as a magnetic tape, phase shift is produced for the chrominance signal due to the time axis variation and nonlinear distortion of the transmission medium to degrade the quality of the transmitted color picture information.

SUMMARY OF THE INVENTION

An object of the present invention is to provide a band conversion system suitable for band conversion of a stationary color picture signal.

Another object of the present invention is to provide a band conversion system suitable for transmitting or recording and reproducing a stationary color picture signal by converting the frequency band thereof as desired.

A further object of the present invention is to provide a band conversion system which degrades very little the quality of picture information even when a stationary color picture signal is transmitted or recorded and reproduced through a transmission medium having a narrow frequency band characteristic.

A still further object of the present invention is to provide a band conversion system suitable for stably transmitting or recording and reproducing with little color distortion a color picture signal even through a transmission medium having characteristics of time axis distortion and giving the transmitted signal nonlinear distortion.

In order to achieve the above objects in the present invention a simultaneous color picture signal is transmitted or recorded and reproduced by being converted into a field sequential signal by utilizing a memory means capable of varying the write-in rate and read-out rate for converting the frequency band of a signal.

For example, denoting the luminance signal of frame skip type stationary color picture information to be transmitted by Y, and denoting two kinds of signals concerning color information, for example R (red) and B (blue), or R – Y and B – Y, or two kinds of color difference signals such as I and Q (these dual color signals will hereinafter be referred to as chrominance signals) by $C_1$ and $C_2$, the stationary color picture signal is subjected to band conversion after it is converted into a field sequential color picture signal in such a manner that during the odd numbered field period the luminance signal Y and the chrominance signal $C_1$ are transmitted and during the even numbered field period the luminance signal Y and the chrominance signal $C_2$ are transmitted.

In order to reconvert the color picture signal of a narrow band into the original signal of a wide band it is sufficient to output the chrominance signals $C_1$ and $C_2$ additively for the odd numbered field period and the even numbered field period.

DESCRIPTION OF THE PREFERRED EMBODIMENT

Figure 1:
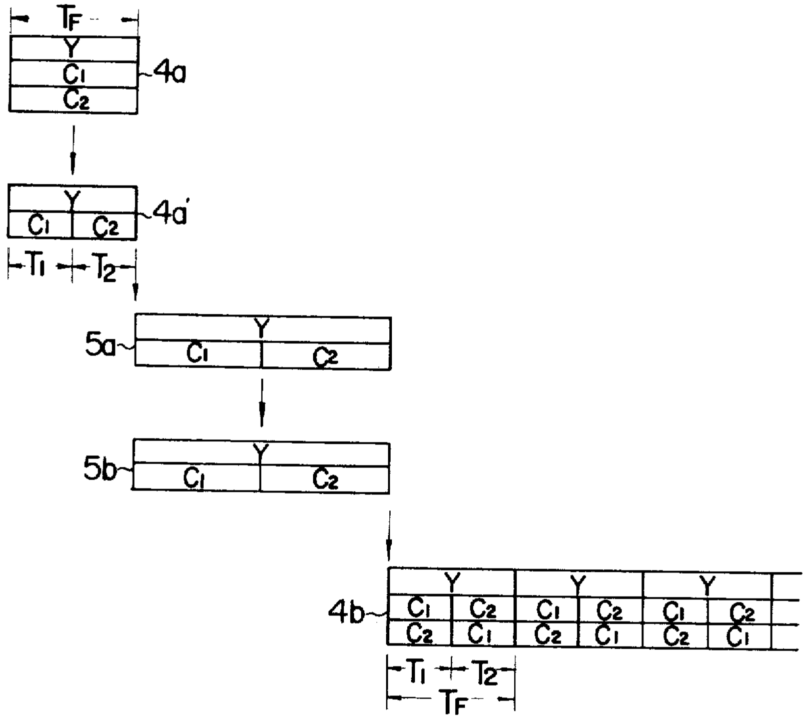
FIG. 1 is a structure of the color picture signal according to the present invention in the processes of conversion.

FIG. 1 illustrates the structure of a color picture signal to be transmitted in the transmission system employing the band conversion system according to the present invention. The simultaneous color picture signal 4*a* at one frame period $T_F$ corresponding to the frame skip type stationary color picture information to be transmitted consists of the luminance signal Y corresponding to the picture information and the chrominance signals $C_1$ and $C_2$ also corresponding to the picture information at both odd numbered field period $T_1$ and even numbered field period $T_2$. On the transmitting side the simultaneous color picture signal 4*a* is converted into a field sequential color picture signal 4*a* ' consisting of Y and $C_1$ at the odd numbered period $T_1$ and Y and $C_2$ at the even numbered field period $T_2$. When the picture signal 4*a*' is to be transmitted through a transmission medium of a narrow band for example, the transmission rate is converted into one corresponding to the band to provide a field sequential color picture transmission signal 5*a* of a narrow band. A field sequential color picture signal 5*b* obtained by transmitting the transmission signal 5*a* through the transmission medium is received on the reception side and in reconverting it into the rate corresponding to the band of the original picture signal the chrominance signal $C_2$ of the even numbered field is added thereto at the odd numbered field period $T_1$ and the chrominance signal $C_1$ of the odd numbered field is added at the even numbered field period $T_2$ so that a simultaneous color picture signal of a wide band composed of Y, $C_1$ and C $_2$ reemerges throughout the frame period $T_F$. By repeating the adding operation at each frame period $T_F$ a continuous stationary color picture signal 4*b* is provided.

Figure 2:
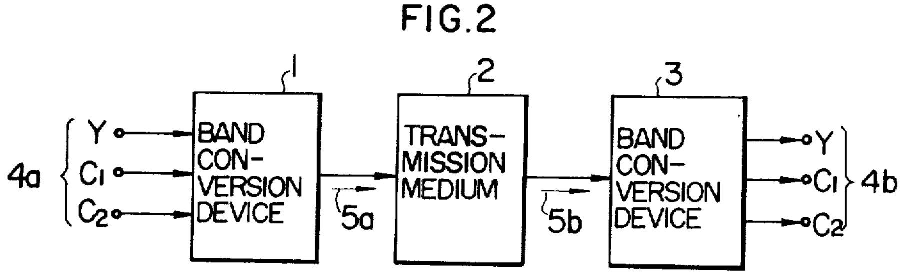
FIG. 2 is a block diagram of a transmission system employing the band conversion system according to the present invention.

The color picture signal transmission system according to the present invention shown in FIG. 2 consists of a band conversion device 1 for converting the simultaneous color picture signal 4*a* corresponding to the frame skip type stationary color picture information to be transmitted into the field sequential color picture transmission signal 5*a*, a transmission medium 2 including not only signal transmission lines but also means for recording and reproducing for transmitting the signal 5*a*, and a band conversion device 3 for reconverting the field sequential color picture signal 5*b* obtained by transmitting the signal 5*a* through the transmission medium 2 into the original simultaneous color picture signal 4*b*.

The structure of the band conversion devices 1 and 3 will next be described referring to FIGS. 3 and 6, respectively.

Figure 3:
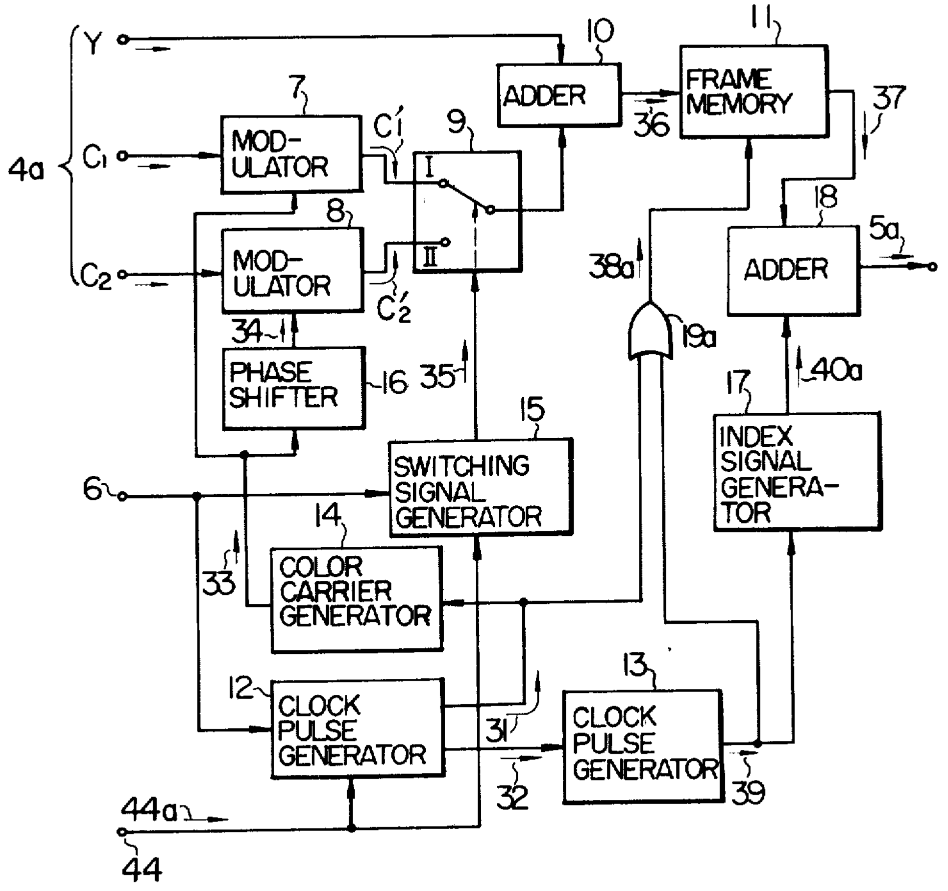
FIG. 3 is a block diagram of an embodiment of the system for converting the simultaneous color picture signal of a wide band into the field sequential color picture signal of a narrow band according to the present invention.

In FIG. 3, reference numeral 6 designates an input terminal to which a start pulse signal for instructing the start of the conversion is applied, and reference numeral 44 designates an input terminal to which a synchronizing signal 44*a* concerning the input signal 4*a* is applied. Reference numerals 7 and 8 designate amplitude modulators for amplitude modulating color carrier signals 33 and 34 in accordance with two kinds of chrominance signals $C_1$ and $C_2$, respectively. Here, the amplitude modulators 7 and 8 are carrier wave suppression modulators for providing carrier chrominance signals $C_1'$ and $C_2'$ by suppressing the color carrier signals, respectively. Reference numeral 9 designates a field change-over switch which is alternately switched between the contact I during the odd numbered field period $T_1$ and the contact II during the even numbered field period $T_2$ each time a field switching signal 35 is applied thereto. Reference numeral 10 designates a signal adder for combining the luminance signal Y and the carrier chrominance signal $C_1'$ or $C_2'$ obtained by switching for each field. Reference numeral 11 designates a frame memory capable of successively writing in or reading out a combined signal 36 from the signal adder 10 in response to a clock pulse signal 38*a* like a shift register, for example. When a shift register unable to directly store the analog signal is employed as the frame memory 11, an analog to digital converter is utilized to convert the analog signal into the digital signal. The frame memory 11 has the memory capacity just to store the picture information of one frame. Reference numeral 12 designates a write-in clock pulse signal generator for generating a high speed write-in clock pulse signal 31 necessary for writing in the frame memory 11 only during one frame period from the start of the first odd numbered field to the end of the even numbered field in response to the synchronizing signal 44*a* applied to the synchronizing signal input terminal 44 when the start pulse signal is applied to the input terminal 6 and for generating a write-in end pulse signal 32 when the frame memory 11 is filled up by the successive writing in. The filling up of the frame memory 11 can be known by detecting the counted number of the produced clock pulses being equal to the bit number of the memory capacity of the frame memory 11. Reference numeral 13 designates a read-out clock pulse signal generator which produces a low speed readout clock pulse signal 39 necessary for reading from the frame memory 11 when the write-in end pulse signal 32 is applied thereto. Reference numeral 14 designates a color carrier signal generator which produces the color carrier signal 33 by stepping down the write-in clock pulse signal 31 to one half of its frequency. Reference numeral 16 designates a phase shifter to invert the phase of the color carrier signal 33. Reference numeral 15 designates a field switching signal generator generating the field switching signal 35 at the starting time of the odd numbered field and at the starting time of the even numbered field in response to the synchronizing signal 44*a* each time the start pulse signal is applied. Reference numeral 17 designates an index signal generator which generates a frame start index signal 40*a* indicative of the frame start of a read-out picture signal 37 produced by the frame memory 11, and reference numeral 18 designates an index signal adder which performs the addition of the index signal 40*a* and the read-out picture signal 37. Reference numeral 19*a* designates an OR gate which passes the write-in clock pulse signal 31 during the write-in period of the frame memory 11 and passes the read-out clock pulse signal 39 during the read-out period of the memory 11.

In operation, by the application of a start pulse signal to the input terminal 6 the write-in clock pulse signal generator 12 produces the write-in clock pulse signal 31 which is supplied to the color carrier signal generator 14 and the OR gate 19*a*. The write-in clock pulse signal 31 applied to the color carrier signal generator 14 is stepped down to one half of its frequency to become the color carrier signal 33 which is amplitude modulated by the carrier wave suppression modulator 7 in response to the chrominance signal $C_1$ of the input simultaneous color picture signal 4*a* to be converted into the carrier chrominance signal $C_1'$ from which color carrier signal component is suppressed. On the other hand, the part of the color carrier signal 33 applied to the phase shifter 16 is inverted in its phase to become the color carrier signal 34 which is amplitude modulated by the carrier wave suppression modultor 8 in response to the chrominance signal $C_2$ of the picture signal 4*a* to be converted into the color carrier signal component suppressed carrier chrominance signal $C_2'$.

At the starting time of the first odd numbered field the field switching signal generator 15 produces the field switching signal 35 in response to the synchronizing signal 44*a*. The signal 35 switches the changeover switch 9 to the contact I side to combine the luminance signal Y and the carrier chrominance signal $C_1'$ by the signal adder 10 during the first odd numbered field period $T_1$. During the next even numbered period $T_2$ the change-over switch 9 is switched to the contact II side by the field switching signal 35 again produced at the starting time of the even numbered field. As a result, the luminance signal Y and the carrier chrominance signal $C_2'$ are combined by the signal adder 10. The thus obtained field sequential combined signal 36 is successively written in the frame memory 11 at each clock of the clock pulse signal 38*a* obtained by passing the write-in clock pulse signal 31 through the OR gate 19*a*.

Upon the filling up of the frame memory 11 by this successive writing in, that is, upon the completion of the writing in of the inputted one frame picture information, the write-in clock pulse generator 12 produces the write-in end pulse signal 32 which is supplied to the read-out clock pulse signal generator 13. Thereupon, the read-out clock pulse signal 39 is generated which is applied to the frame memory 11 through the OR gate 19*a*. At each clock of the clock pulse signal 39 the picture signal is successively read out from the frame memory 11 to provide the read out picture singal 37 having indices corresponding to the clocks. Here, if the repetition frequency $f_R$ of the read-out clock pulse signal 39 has been made lower than that $f_W$ of the write-in clock pulse signal 31, the high rate combined signal 36 is converted into the low rate read-out picture signal 37. Generally, the band conversion corresponding to the frequency ratio $f_R/f_W$ is possible. By adding the frame start index signal 40*a* produced by the index signal generator 17 to the thus obtained low rate read-out picture signal 37 having clock indices by means of the signal adder 18 the narrow band field sequential color picture transmission signal 5*a* can be provided.

Incidentally, it is preferable to select the relation between the repetition frequency $f_W$ of the write-in clock pulse signal 31, the repetition frequency $f_C$ of the color carrier signals 33 and 34, and the horizontal repetition frequency $f_H$ as determined by $$f_C = f_H \times \text{integer} \quad (1)$$

$$f_W = 2 \times f_C \quad (2)$$

Figure 4:
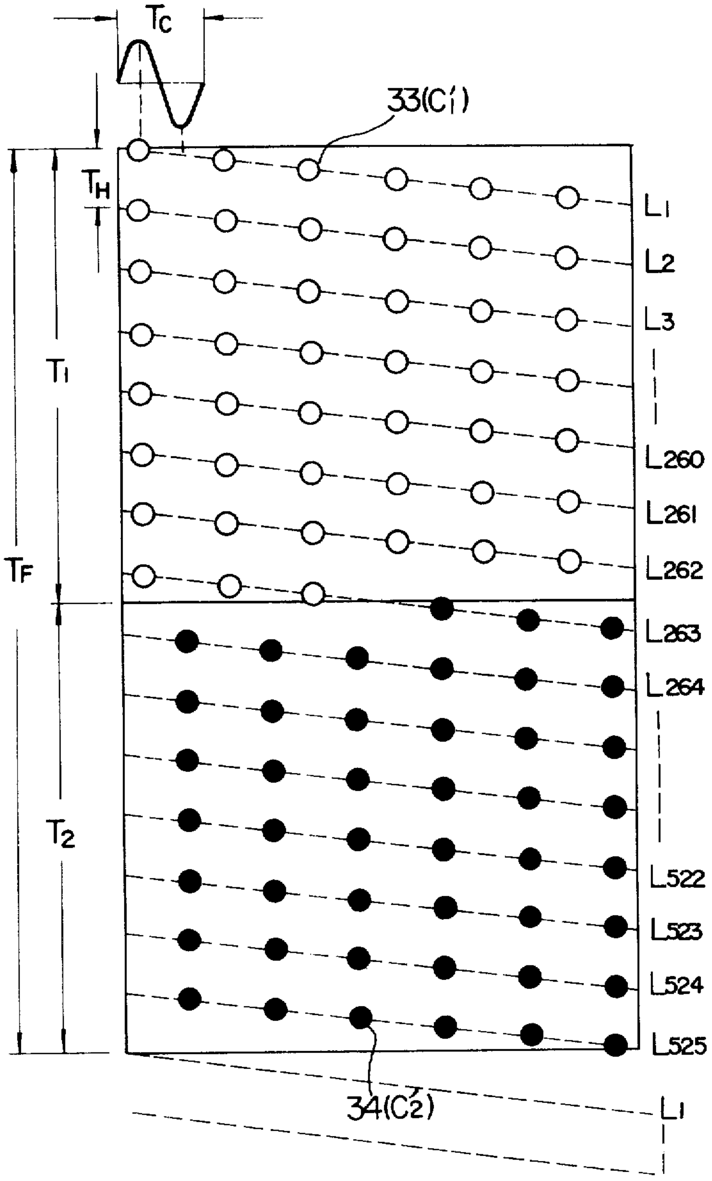
FIG. 4 is a schematic diagram illustrating the relationship between the color carrier signal and the scanning position of the picture.

FIG. 4 shows the relationship between the positive wave front phase of the color carrier signals 33 and 34 as determined by Equation (1) and the scanning position of the picture for the case of the 525 horizontal scanning lines as, for example, in the Japan Standard Television Broadcasting System. Reference character $T_C$ designates the repetition period of the color carrier signal, and reference character $T_H$ designates the horizontal repetition period. Hollow or white circles in the odd numbered field period $T_1$ (=262.5 × $T_H$) designate the positive wave front phase of the color carrier signal 33, and solid or black circles in the even numbered field period $T_2$ (= 262.5 × $T_H$) designate the positive wave front phase of the color carrier signal 34.

By inverting the phase of the color carrier signal in the even numbered field as above, the dot jamming by the color carrier signal on the picture on the receiving side can be eliminated visually.

Figure 5:
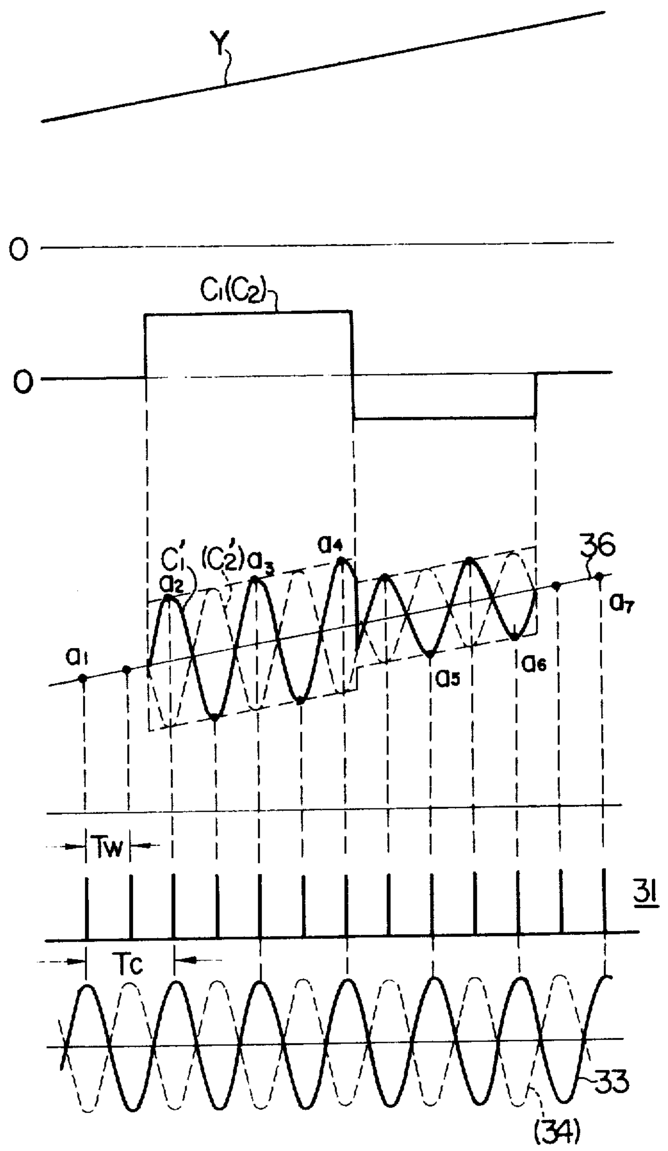
FIG. 5 is a diagram of signal waveforms for explaining the operation of the system of FIG. 3.

FIG. 5 shows the relationship between the write-in clock pulse signal 31 determinable by Equation (2) and the color carrier signal 33 or 34 for the case that the luminance signal Y and the chrominace signal $C_1$ or $C_2$ are synthesized by an amplitude modulation method based on carrier wave suppression. The amplitude of the synthesized signal 36 is sampled at each repetition period $T_W$ of the write-in clock pulse signal 31 to be written in the frame memory 11. If, in this case, the write-in clock pulse signal 31 and the color carrier signal 33 or 34 are in the phase relation with each other shown in FIG. 5, the carrier chrominance signal $C_1'$ or $C_2'$ part is always sampled at its wave front. Consequently, as will be described below, if on the receiving side the synthesized signal 36 is stepped down to one half of its frequency in response to the clock indices contained therein to successively sample the phases . . . $a_1, a_2, \ldots, a_7, \ldots$, the chrominance signal $C_1$ or $C_2$ can conversely, be synchronously detected from the synthesized signal 36.

A description will next be made of the system 3 for reconverting the thus obtained narrow band signal into the original wide band signal referring to FIG. 6. Reference numeral 20 designates an index signal separating circuit for separating a clock information signal 50 and a frame start index signal 40*b* from the field sequential color picture signal 5*b* in response to the clock index thereof. Reference numerals 21*a* and 21*b* designate field memories capable of successively writing or reading the picture signal in response to a clock pulse signal 38*b* and having the memory capacity of just one half of a frame of picture information, for example a memory capacity 262.5H (the information capacity of one line picture will hereinafter be referred to as 1H) of the picture information for 262.5 lines in the case of 525 horizontal scanning lines. Reference numeral 22 designates a $T_H/2$ delay circuit for delaying a picture signal 46 read from the field memory 21*a* by a time $T_1/2$. Reference numeral 23 designates write-in clock pulse signal generator which shapes the clock information signal 50 from the index signal separating circuit 20 to convert it into a low speed write-in clock pulse signal 41 necessary for writting in the field memories 21*a* and 21*b*. Upon filling up of both field memories 21*a* and 21*b* by the supply of the clock pulse signal 41, the clock pulse signal generator 23 generates a write-in end pulse signal 42. Reference numeral 24 designates a read-out clock pulse signal generator which, upon the application of the write-in end pulse signal 42 therto, produces a high speed read-out clock pulse signal 43 necessary for reading from the field memories 21*a* and 21*b*. Reference numeral 25 designates color synchronizing signal generator which steps down the read-out clock pulse signal 43 to one half of its frequency to produce two kinds of color synchronizing signals 49 and 51 which are inverted in their phases between the odd numbered field period and the even numbered field period at the reading time from the field memories 21*a* and 21*b* and are shifted in their phases from each other by $\pi$ radians. This is because, since the phase of the color carrier signal differs by $\pi$ radians between the odd numbered field and the even numbered field and moreover signals change their places with each other between the field memories 21*a* and 21*b* at each field, this must be correctly remodulated. Reference numeral 26 designates a luminance separating circuit for separating the luminance signal Y from a picture signal 47 read from the field memory 21*b*, and reference numerals 27*a* and 27*b* designates synchronous detector circuits synchronously detecting the chrominance signal C from the picture signals 47 and 48 in response to the color synchronizing signals 49 and 51, respectively. When the carrier chrominance signal is not of the carrier wave suppression type, it is sufficient to employ envelope detectors as the synchronous detector circuits 27*a* and 27*b*. Reference numeral 28 designates a synchronizing signal generator for producing horizontal and vertical synchronizing signals 44*b* in response to the read-out clock pulse signal 43, and reference numeral 29 designates a frame change-over switch which is switched between its contacts III and IV each time the frame start index signal 40*b* and the write-in end pulse signal 42 are applied thereto through the OR gate 19*b*.

In operation, first, the narrow band field sequential color picture signal 5*b* is separated into the clock information signal 50, the frame start index signal 40*b*, and the picture signal 45 by the index signal separating circuit 20. The clock information signal 50 is easily separated from picture signal 5*b* by using clipper, because the sampling signal of the picture signal 5*b* is used as the clock information signal 50. Since the frame start index signal 40*b* is applied to the frame change-over switch 29 through the OR gate 19*b*, the switch 29 is turned to the contact III to apply the picture signal to the field memory 21*a*. On the other hand, the clock information signal 50 is shaped by the write-in clock pulse signal generator 23 to become the low speed write-in clock pulse signal 41 which is applied to the field memories 21*a* and 21*b* through the OR gate 19*c*. At each clock of the write-in clock pulse signal 41 the picture signal 45 is successively written in the field memory 21*a*. However, even when the field memory 21*a* is filled up, the clock pulse signal 41 continues to be applied thereto. As a result, after the filling up of the field memory 21*a*, the content of the field memory 21*a* is successively read out at each clock and written in the field memory 21*b*. Thus, when both the field memories 21*a* and 21*b* are filled up, in other words, when the writing the input field sequentially picture information of one frame is completed, the write-in end pulse signal 42 is produced by the write-in clock pulse signal generator 23 to be applied to the read-out clock pulse signal generator 24, when the high speed read-out clock pulse signal 43 is produced and applied to the field memories 21*a* and 21*b* through the OR gate 19*c*. At clocks of the clock pulse signal 43 the picture signals 46 and 47 are successively read from the field memories 21*a* and 21*b*, respectively.

On the other hand, the write-in end pulse signal 42 is applied to the frame change-over switch 29 through the OR gate 19*b* to turn the switch 29 to the contact IV side. Thus, the field memories 21*a* and 21*b* are connected endlessly during their reading period, and the read out picture signal circulates the path 21*b* ⟶ IV ⟶ 21*a* ⟶ 21*b* at each clock. The picture signal 47 read out in response to the high speed read-out clock pulse signal 43 is separated into the luminance signal Y and the chrominance signal C by the luminance separation circuit 26 and the synchronous detector 27*a*, while the picture signal 46 read out in response to the read-out clock pulse signal 43 is, after it is delayed by the time $T_H/2$ by the $T_H/2$ delay circuit 22, separated therefrom the chrominance signal C by the synchronous detector 27*b*. Here, since of the input picture signal of one frame the picture signal of the first odd numbered field (i.e. the synthesized signal of Y and $C_1$ ) is written in the field memory 21*b* and the picture signal of the next even numbered field (i.e. the synthessized signal of Y and $C_2$) is written in the field memory 21*a*, the picture signals 47 and 46 simultaneously read from the field memories 21*b* and 21*a* respectively, during the first odd numbered field period in the reading time can provide the luminance signal Y and the chrominance signals $C_1$ and $C_2$. At the time of completion of reading in the odd numbered field period the synthesized signal of the luminance signal Y and the chrominance signal $C_2$ written in the field memory 21a has been transferred to the field memory 21*b*, and the synthesized signal of the luminance signal Y and the chrominance signal $C_1$ written in the field memory 21*b* has been transferred to the field memory 21*a* through the contact IV. As a result, in the next even numbered field read out period the read out picture signal 47 can provide the luminance signal Y and the chrominance signal $C_2$, and the read out picture signal 46 can provide the luminance signal Y and the chrominance signal $C_1$. In the succeeding odd numbered field read out period, the original state is restored, that is, the picture signal 47 can provide the luminance signal Y and the chrominance signal $C_1$ and the picture signal 46 can provide the luminance signal Y and the chrominance signal $C_2$. In this manner, the read out signals are reproduced as the chrominance signals by the synchronous detectors 27*a* and 27*b*. But these chrominance signals $C_1$ and $C_2$ alternate for each one field. Consequently, by employing a switch (not shown) which switches over at each field after the synchronous detectors 27*a* and 27*b* two separate continuous chrominance signals $C_1$ and $C_2$ can be provided. By repeating the above operation the field sequential color picture transmission signal of a narrow band transmitted from the transmitting side can be reconverted into the original simultaneous color picture signal of a wide band 4*b*. Furthermore, the transmission of the picture information of only one frame on the transmitting side is sufficient for enabling the receiving side to perform the recoversion into a continuous stationary picture signal.

The operation of the $T_H/2$ delay circuit 22 will be briefly described for the case of the 525 horizontal scanning lines referring to FIG. 4. Both field memories 21*a* and 21*b* have the memory capacity of 262.5H and during the first frame period $T_F$ at the reading time the line picture information of the horizontal scanning lines $L_1$, $L_2$, . . . , $L_{262}$ and the first half of the line $L_{263}$ and the line picture information of the second half of the horizontal scanning line $L_{263}$ and the lines $L_{254}$, . . . , $L_{525}$ are successively read out in parallel from the field memories 21*b* and 21*a*, respectively. In this case, since the latter read out picture information is delayed by the time $T_H/2$ by the $T_H/2$ delay circuit 22, the first horizontal period $L_1'$ of the simultaneous picture signal 4*b* is constituted by the luminance signal Y and the chrominance signal $C_1$ of the first horizontal line $L_1$ at its first half $T_H/2$ period and by the luminance signal Y and the chrominance signal $C_1$ of the first line $L_1$ and the chrominance signal $C_2$ of the second half of the line $L_{263}$ at its second half $T_H/2$ period, respectively. The second horizontal period $L_2'$ of the picture signal 4*b* is constituted by the lluminance signal Y and the chrominance signal $C_1$ of the second line $L_2$ and the chrominance signal $C_2$ of the line $L_{264}$. Generally, the m-th horizontal period $L_m'$ is constituted by the luminance signal Y and the chrominance signal $C_1$ of the *m*-th line $L_m$ and the chrominace signal $C_2$ of the ($m$ + 262)-th line $L_m$ + 262 at the odd number field period $T_1$ and by the luminance signal Y and the choromінance signal $C_2$ of the line $L_m$ and the chrominance signal $C_1$ of the ($m$–263)-th line $L_m$-263 at the even numbered field period $T_2$, respectively. Furthermore, since the phases of the color carrier signals at the odd numbered field period $T_1$ and at the even numbered field period $T_2$ are different from each other by $\pi$ radians, the color carrier wave component of the chrominance signal $C_1$ and the color carrier wave component of the chrominance signal $C_2$ cancel each other when the picture signal is converted into the simultaneous one on the receiving side to visually reduce the dot jamming due to the color carrier wave component.

Figure 6:
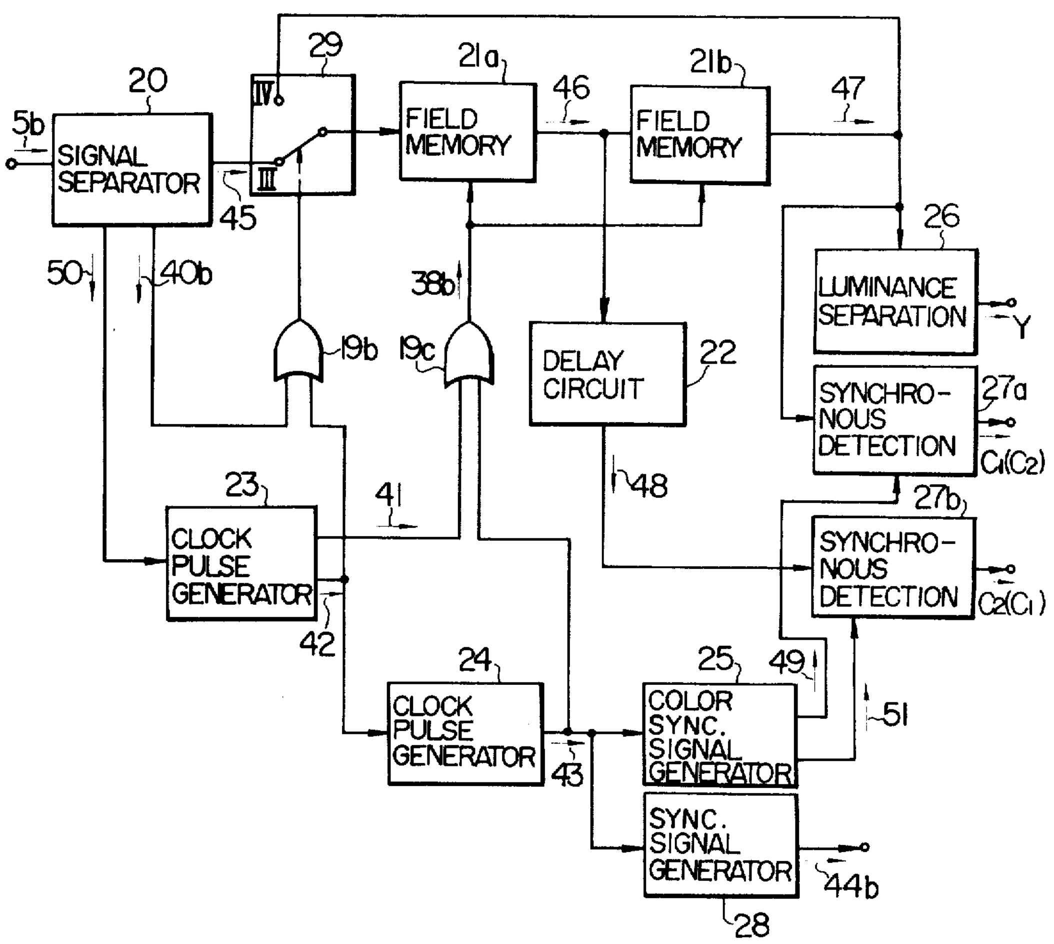
FIG. 6 is an embodiment of the system for converting the field sequential color picture signal of a narrow band into the simultaneous color picture signal of a wide band.

To generalize the above situation for the case of 2*n* + 1 horizontal scanning lines it is sufficient to make the memory capacity of both field memories 21*a* and 21*b* in FIG. 6 ($n$ + ½)·H. Here, if the memory capacities of the field memories 21*a* and 21*b* are not made equal to each other, but if a memory having the memory capacity ($n$ + 1)·H is employed as the field memory 21*a* and a memory having the memory capacity $n \cdot H$ is employed as the field memory **21*b*, a converting operation similar to the above can be performed without employing the $T_H/2$ delay circuit 22 since the field memory 21*b* begins storing with the $(n + 2)$-th horizontal scanning line. Conversely, the memory capacities of the field memories 21*a* and 21*b* may be made $n \cdot H$ and $(n + 1) \cdot H$, respectively. However, in this case the $m$-th horizontal period $L_m'$ of the simultaneous picture signal 4*b*** is composed of the luminance signal Y and the chrominance signal $C_1$ of the line $L_m$ and the chrominance signal $C_2$ of the line $L_{m+n+1}$ at the odd numbered field period $T_1$ and of the luminance signal Y and the chrominance signal $C_2$ of the line $L_m$ and the chrominance signal $C_1$ of the line $L_{m-n}$ at the even numbered field period $T_2$.

We claim:

1. A stationary color picture signal band conversion system for converting a simultaneous color picture signal of a wide band consisting of a luminance signal and two kinds of chrominance signals into a field sequential color picture signal of a narrow band, comprising:

memory means having the memory capacityy capable of storing a picture signal of one frame and capable of varying the writing speed and the reading speed;

means for switching two kinds of chrominance signals at every field period to selectively output them;

means for extracting a signal of one frame of a color picture signal;

means for supplying the two kinds of chrominance signals of the one frame of color picture signal extracted by the extracting means to the switching means and for writing one chrominance signal selected at one of the two field periods constituting the one frame together with the luminance signal at this field period in the memory means;

means for writing the other chrominance signal selected at the other field period together with the luminance signal at the latter field period in the memory means; and means for reading the signals written in the memory means after completion of the writing at a speed lower than the writing speed to output them.

2. A stationary color picture signal band conversion system for converting a simultaneous color picture signal of a wide band into a field sequential color picture signal of a narrow band, comprising:

memory means having the memory capacity capable of storing a picture signal of one frame and capable of varying the writing speed and the reading speed, the memory means including;

analog to digital converting means, a shift register supplied with the output signal of the analog to digital converting means, digital to analog converting means for converting the output signal of the shift register into an analog signal, and clock pulse generating means for generating clock pulses whose period can be varied and which are supplied to the shift register;

means for switching two input signals at everyy field period to selectively output them;

means for extracting a signal of one frame of a color picture signal consisting of a luminance signal and two kinds of chrominance signals;

means for supplying the two kinds of chrominace signals of the one frame of color picture signal extracted by the extracting means to the switching means and for writing one chrominance signal selected at one of the two field periods constituting the one frame together with the luminance signal at this field period in the memory means;

means for writing the other chrominance signal selected at the other field period together with the luminance signal at the latter field period in the memory means; and means for reading the signals written in the memory means at a speed lower than the writing speed to output them.

3. A color picture signal band conversion system for converting a simultaneous color picture signal of a wide band into a field sequential color picture signal of a narrow band, comprising:

memory means having the memory capacity capable of storing a picture signal of one frame and capable of varying the writing speed and the reading speed;

means for switching two input signals at every field period to selectively output them;

means for extracting a signal of one frame of a color picture signal consisting of a luminance signal and two kinds of chrominance signals;

means for supplying the two kinds of chrominance signals of the one frame of color picture signal extracted by the extracting means to the switching means and for writing one chrominance signal selected at one of the two field periods constituting the one frame together with the luminance signal at this field period in the memory means;

means for writing the other chrominance signal selected at the other field period together with the luminance signal at the latter field period in the memory means;

means for reading the signals written in the memory means at a speed lower than the writing speed to output them; and means for adding an index signal to the color picture signal converted into the signal of the narrow band.

4. A color picture signal band conversion system for converting a simultaneous color picture signal of a wide band into a field sequential color picture signal of a narrow band, comprising:

memory means having the memory capacity capable of storing a picture signal of one frame and capable of varying the writing speed and the reading speed;

means for switching two input signals at every field period to selectively output them;

means for extracting a signal of one frame of a color picture signal consisting of a luminance signal and two kinds of chrominance signals;

means for supplying the two kinds of chrominance signals of the one frame of color picture signal extracted by the extracting means to the switching means and for writing one chrominance signal selected at one of the two field periods constituting the one frame together with the luminance signal at this field period in the memory means;

means for writing the other chrominance signal selected at the other field period together with the luminance signal at the latter field period in the memory means;

means for reading the signals written in the memory means at a speed lower than the writing speed to output them;

means for generating a color carrier wave signal having the frequency an integer times as high as the horizontal scanning frequency of the picture signal;

phase inverting means;

means for modulating the color carrier wave signal with one of the two kinds of chrominance signals at one of the two field periods of one frame and for writing the modulated signal in the memory means; and means for modulating the color carrier wave signal passed through the phase inverting means with the other chrominance signal at the other field period and for writing the latter modulated signal in the memory means.

5. A color picture signal band conversion system for converting a field sequential color picture signal of a narrow band into a simultaneous color picture signal of a wide band, comprising:

memory means with two read-out output terminals having the memory capacity capable of storing a picture signal of one frame, capable of varying the writing speed and the reading speed, capable of repeatedly reading the stored signals, and capable of simultaneously reading signals differing by one field period;

means for writing one frame signal of the picture signal of the narrow band in the memory means at a low speed corresponding to the transmission speed of the picture signal; and means for repeatedly reading, upon completion of the writing, the content of the memory means at a high speed corresponding to the signal of the wide band to simultaneously provide chrominance signals at the two output terminals and to provide a luminance signal at one of the output terminals.

6. A band conversion system according to claim 5, comprising delay means having the delay time of one half of one scanning line period and means for outputting the chrominance signal read from one of the output terminals of the memory means through the delay means.

7. A band conversion system according to claim 6, in which the memory means comprises series connected two memory means each having the memory capacity capable of storing a picture signal of one field.

8. A band conversion system according to claim 5, in which the memory means comprises a memory capable of performing writing and reading of a signal at a speed corresponding to the period of the supplied clock pulses.

9. A band conversion system according to claim 5, in which the memory means comprises series connected two memory means having the memory capacities capable of storing a signal of $n$ lines of $(2n + 1)$ scanning lines constituting one frame and a signal of $(n + 1)$ lines thereof, respectively.

10. A stationary color picture signal band conversion system for converting a simultaneous color picture signal of a wide band into a field sequential color picture signal of a narrow band, comprising:

memory means including means for generating clock pulses whose frequency can be varied, and a memory device having a memory capacity capable of storing a picture signal of one frame and capable of performing writing and reading of a signal at a speed corresponding to the frequency of the clock pulses;

means for switching two input signals at every field period to selectively output them;

means for extracting a signal of one frame of a color picture signal consisting of a luminance signal and two kinds of chrominance signals;

means for supplying the two kinds of chrominance signals of the one frame of color picture signal extracted by the extracting means to the switching means and for writing one chrominance signal selected at one of the two field periods constituting the one frame together with the luminance signal at this field period in the memory means;

means for writing the other chrominance signal selected at the other field period together with the luminance signal at the latter field period in the memory means; and means for reading the signals written in the memory means at a speed lower than the writing speed to output them.

11. A stationary color picture signal band conversion system for converting a field sequential color picture signal of a narrow band into a simultaneous color picture signal of a wide band, comprising:

memory means with two output terminals including a first memory device having memory capacity capable of storing a picture signal of one field, and capable of varying the writing speed and the reading speed, a second memory device having a memory capacity capable of storing a picture signal of one field, and capable of varying the writing speed and the reading speed, means for connecting the output terminal of said first memory device to the input terminal of said second memory device, means for supplying the read-out signal of said second memory device to the input terminal of said first memory device upon completion of the writing, and means for outputting the read-out signals simultaneously from the output terminals of said first and second memory devices;

means for writing one frame signal of the picture signal of the narrow band in the memory means at a low speed corresponding to the transmission speed of the picture signal; and means for repeatedly reading, upon completion of the writing, the content of the memory means at a high speed corresponding to the signal of the wide band to simultaneously provide chrominance signals at the two output terminals and to provide a luminance signal at one of the output terminals.

* * * * *